United States Patent
Webber et al.

(10) Patent No.: US 9,321,478 B2
(45) Date of Patent: Apr. 26, 2016

(54) ELECTRIC POWER STEERING ASSEMBLY

(71) Applicant: TRW Automotive U.S. LLC, Livonia, MI (US)

(72) Inventors: Paul Webber, Rochester Hills, MI (US); Andrew Dixon, Royal Oak, MI (US); Colleen Kalczynski, Shelby Township, MI (US); John F. Santori, Shelby Township, MI (US); John Spetz, Washington, MI (US); Changming Wu, Plymouth, MI (US); Brian Urbach, Rochester Hills, MI (US); Mark Bugosh, Sterling Heights, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 499 days.

(21) Appl. No.: 13/803,722

(22) Filed: Mar. 14, 2013

(65) Prior Publication Data

US 2014/0260727 A1    Sep. 18, 2014

(51) Int. Cl.
*B62D 5/04* (2006.01)
*F16C 35/067* (2006.01)

(52) U.S. Cl.
CPC ............ *B62D 5/0424* (2013.01); *B62D 5/0448* (2013.01); *F16C 35/067* (2013.01); *Y10T 74/18576* (2015.01)

(58) Field of Classification Search
CPC .... B62D 5/0424; B62D 5/0448; F16C 35/067
USPC ......... 74/89.36; 411/132; 280/93.513, 93.515
See application file for complete search history.

(56) References Cited

U.S. PATENT DOCUMENTS 2,192,378 A * 3/1940 Horger .......................... 411/132
6,378,646 B1    4/2002 Bugosh
6,644,432 B1   11/2003 Yost et al.
(Continued)

FOREIGN PATENT DOCUMENTS

JP    2012025246 A    2/2012
JP    2012224191 A    9/2012
(Continued)

OTHER PUBLICATIONS

Notification of Transmittal of the International Search Report and the Written Opinion of the International Searching Authority, or the Declaration dated Jun. 16, 2014.

*Primary Examiner* — William C Joyce
(74) *Attorney, Agent, or Firm* — MacMillan, Sobanski & Todd, LLC

(57) ABSTRACT

A rack drive assembly adapted for use in a vehicle electric power steering assembly includes a bearing assembly disposed in a rack housing and carried by a ball nut assembly for rotatably supporting the ball nut assembly relative to a steering member; and a spanner nut carried by the rack housing for securing the bearing assembly in the rack housing. A first isolator, a second isolator and a first shim are provided wherein the first isolator is disposed between an inner surface of the housing and a first surface of an outer race of the bearing, the second isolator is disposed between an opposite second surface of the outer race of said bearing and the first shim, the first shim is disposed between the second isolator and the spanner nut. The first shim is provided with a member configured to be coupled to the housing to allow for axial movement but prevent rotational motion of the shim during installation of the spanner nut.

17 Claims, 4 Drawing Sheets

(56) References Cited

U.S. PATENT DOCUMENTS

| | | |
|---|---|---|
| 7,055,646 B2 | 6/2006 | Bugosh |
| 8,104,567 B2 | 1/2012 | Murakami et al. |
| 8,307,940 B2 | 11/2012 | Bugosh et al. |
| 8,505,676 B2 | 8/2013 | Yamamoto |
| 8,689,927 B2 | 4/2014 | Yamamoto et al. |
| 2010/0319471 A1 | 12/2010 | Nam et al. |
| 2011/0127742 A1* | 6/2011 | Bae et al. ............. 280/93.513 |

FOREIGN PATENT DOCUMENTS

| | | |
|---|---|---|
| JP | 2013006517 A | 1/2013 |
| KR | 1020100137170 A | 12/2010 |

* cited by examiner

ELECTRIC POWER STEERING ASSEMBLY

BACKGROUND OF THE INVENTION

This invention relates in general to vehicle electric power steering assemblies and in particular to an improved rack drive assembly adapted for use in such a vehicle electric power steering assembly.

One known electric power steering assembly for turning steerable wheels of a vehicle includes a ball nut for transmitting force between an axially movable rack member and an electric motor. Upon actuation of the electric motor of the power steering assembly, the ball nut is driven to rotate relative to the rack member. The rotational force of the ball nut is transmitted to the rack member by balls to drive the rack member axially. The axial movement of the rack member by the balls effects turning movement of the steerable wheels.

The electric motor in the above-described electric power steering assembly can be coupled to drive the ball nut in various known methods. One such method includes a belt drive assembly wherein an output shaft of the electric motor is connected via a belt to a pulley assembly. The pulley assembly typically includes a pulley which is operatively fixed to the ball nut so that the ball nut rotates with the pulley when the electric motor is actuated. This type of electric power steering assembly has advantages over other known electric power steering assemblies. However, when this type of electric power steering assembly is actuated, undesirable noise can be produced from one or more of the associated components of the rack drive assembly.

Thus, it would be desirable to provide an improved structure for a rack drive assembly of an electric power steering assembly which reduces noise in the assembly and yet is simple and inexpensive.

SUMMARY OF THE INVENTION

This invention relates to an improved structure for a rack drive assembly adapted for use in a vehicle electric power steering assembly.

According to one embodiment, the rack drive assembly is adapted for use in the vehicle electric power steering assembly may comprise, individually and/or in combination, one or more of the following features: a steering member disposed in a rack housing and including a rack portion operatively connected to a vehicle steering wheel and a screw portion; a ball nut assembly operatively connected to the screw portion of the rack portion of the steering member for effecting axial movement of the steering member upon rotation of a vehicle steering wheel; a bearing assembly disposed in the rack housing and carried by the ball nut assembly for rotatably supporting the ball nut assembly relative to the steering member; and a spanner nut carried by the rack housing for securing the bearing assembly in the rack housing; wherein a first isolator, a second isolator and a first shim are provided, the first isolator disposed between an inner surface of the housing and a first surface of an outer race of the bearing, the second isolator disposed between an opposite second surface of the outer race of the bearing and the shim, the first shim disposed between the second isolator and the spanner nut, wherein the first shim is provided with a member configured to be coupled to the housing to allow for axial movement but prevent rotational motion of the shim during installation of the spanner nut.

According to this embodiment, the member may be a radially outwardly extending tab provided on an outer portion of the first shim and is configured to be disposed in a groove provided in the housing.

According to this embodiment, the outer race of the bearing assembly may be provided with a radially outwardly extending flange, the flange including a first radially extending side surface and an opposite second radially extending side surface, wherein the first isolator is disposed adjacent the first radially extending side surface and the second isolator is disposed adjacent the second radially extending side surface.

According to this embodiment, the first and second isolators are formed from a compressible material.

According to this embodiment, the first shim is formed from a non-compressible material.

According to this embodiment, the first and second isolators are formed from a compressible material and the first shim is formed from a non-compressible material.

According to this embodiment, the first and second isolator members are identical members.

According to this embodiment, there is further provided a second shim disposed between the inner surface of the housing and the first isolator.

According to this embodiment, the first and second isolators are formed from a compressible material and the first and second shims are formed from a non-compressible material.

According to another embodiment, the rack drive assembly adapted for use in the vehicle electric power steering assembly may comprise, individually and/or in combination, one or more of the following features: a steering member disposed in a rack housing and including a rack portion operatively connected to a vehicle steering wheel and a screw portion; a ball nut assembly operatively connected to the screw portion of the rack portion of the steering member for effecting axial movement of the steering member upon rotation of a vehicle steering wheel; a bearing assembly disposed in the rack housing and carried by the ball nut assembly for rotatably supporting the ball nut assembly relative to the steering member, the bearing assembly having an outer race provided with a radially outwardly extending flange, the flange including a first radially extending side surface and an opposite second radially extending side surface; and a spanner nut carried by the rack housing for securing the bearing assembly in the rack housing; wherein a first isolator, a second isolator and a first shim are provided, the first isolator disposed between an inner surface of the housing and the first radially extending side surface of the flange of the outer race of the bearing, the second isolator disposed between the second radially extending side surface of the flange of the outer race of the bearing and said first shim, said first shim disposed between said second isolator and the spanner nut, wherein the first shim is provided with a member configured to be coupled to the housing to allow for axial movement but prevent rotational motion of the shim during installation of the spanner nut, wherein the first shim is formed from a non-compressible material.

According to this embodiment, the member is a radially outwardly extending tab provided on an outer portion of the first shim and is configured to be disposed in a groove provided in the housing.

According to this embodiment, the first and second isolators are formed from a compressible material.

According to this embodiment, the first and second isolator members are identical members.

According to this embodiment, there is further provided a second shim disposed between the inner surface of the housing and the first isolator.

According to this embodiment, the first and second isolators are formed from a compressible material and the second shim is formed from a non-compressible material.

According to another embodiment, a ball nut assembly, which may be adapted for use in a rack drive assembly of a vehicle electric power steering assembly, the rack drive assembly including a steering member disposed in a rack housing and having a rack portion operatively connected to a vehicle steering wheel and a screw portion, may comprise, individually and/or in combination, one or more of the following features: a ball nut assembly operatively connected to the screw portion of the rack portion of the steering member for effecting axial movement of the steering member upon rotation of a vehicle steering wheel; a bearing assembly fixedly disposed in the rack housing and carried by the ball nut assembly for rotatably supporting the ball nut assembly relative to the steering member; and a spanner nut carried by the rack housing for securing the bearing assembly in the rack housing; wherein a first isolator, a second isolator and a first shim are provided, the first isolator disposed between an inner surface of the housing and a first surface of an outer race of the bearing, the second isolator disposed between an opposite second surface of the outer race of the bearing and the first shim, the first shim disposed between the second isolator and the spanner nut, wherein the first shim is provided with a member configured to be coupled to the housing to allow for axial movement but prevent rotational motion of the shim during installation of the spanner nut.

According to this embodiment, the member is a radially outwardly extending tab provided on an outer portion of the first shim and is configured to be disposed in a groove provided in the housing.

According to this embodiment the outer race of the bearing assembly is provided with a radially outwardly extending flange, the flange including a first radially extending side surface and an opposite second radially extending side surface, wherein the first isolator is disposed adjacent the first radially extending side surface and the second isolator is disposed adjacent the second radially extending side surface.

According to this embodiment the first and second isolators are formed from a compressible material and the first shim is formed from a non-compressible material.

According to this embodiment, there is further provided a second shim disposed between the inner surface of said housing and the first isolator.

Other advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
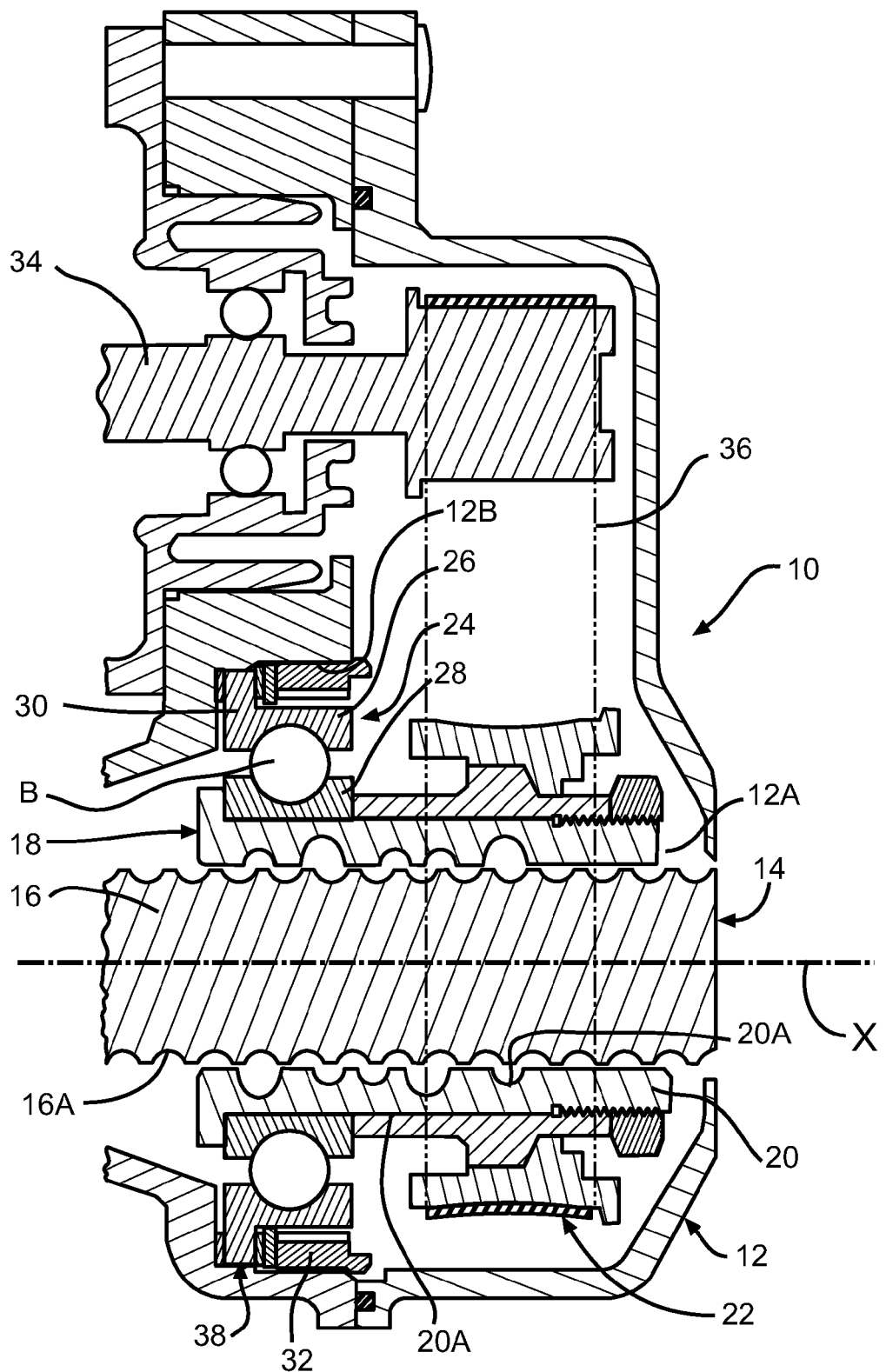
FIG. 1 is a sectional view of a portion of an embodiment of a vehicle electric power steering assembly.

Referring now to FIG. 1, there is illustrated an embodiment of a vehicle electric power steering assembly, indicated generally at 10, constructed in accordance with the present invention. The illustrated vehicle electric power steering assembly 10 is a vehicle electric belt driven rack drive steering assembly and is associated with the front driven wheels (not shown) of the vehicle. The general structure and operation of the electric power steering assembly 10 is conventional in the art. Thus, only those portions of the electric power steering assembly 10 which are necessary for a full understanding of this invention will be explained and illustrated in detail. Also, although this invention will be described and illustrated in connection with the particular electric power steering assembly 10 disclosed herein, it will be appreciated that this invention may be used in connection with other electric power steering assemblies. For example, the invention may be used in connection with other electric power steering assemblies if so desired, such as for example, as shown in U.S. Pat. No. 8,307,940 B2 to Bugosh et al., U.S. Pat. No. 7,055,646 B2 to Bugosh, U.S. Pat. No. 6,644,432 to Yost et al., and U.S. Pat. No. 6,378,646 to Bugosh, the disclosure of each of these patents incorporated by reference in entirety herein.

The illustrated electric power steering assembly 10 includes a rack housing, partially shown and indicated generally at 12, and a steering member, partially shown and indicated generally at 14, disposed therein. The steering member 14 is linearly (or axially) movable along a rack axis X. The steering member 14 includes a rack portion (not shown) which is provided with a series of rack teeth which meshingly engage gear teeth (not shown) provided on a pinion (not shown) which is operatively connected to a steering wheel (not shown) of the vehicle.

In the illustrated embodiment, the steering member 14 further includes a screw portion 16 having an external thread convolution 16A. The steering member 14 is connected with steerable wheels (not shown) of the vehicle through tie rods (not shown) located at the distal ends of the steering member 14. Linear movement of the steering member 14 along the rack axis X results in steering movement of the steerable wheels in a known manner.

The illustrated electric power steering assembly 10 further includes an electric motor (not shown), which as will be discussed below, is drivably connected to a ball nut assembly, indicated generally at 18, for effecting axial movement of the steering member 14 upon rotation of the vehicle steering wheel. In the event of the inability of the electric motor to effect axial movement of the steering member 14, the mechanical connection between gear teeth on the pinion and rack teeth on the rack portion of the steering member 14 permits manual steering of the vehicle.

In the illustrated embodiment, the ball nut assembly 18 is located in a chamber 12A of the rack housing 12 and encircles the screw portion 16 of the steering member 14. The ball nut assembly 18 includes a ball nut 20 which is suitably secured to a pulley assembly, indicated generally at 22, for rotation therewith. In the illustrated embodiment, the pulley assembly 22 is secured to the ball nut assembly 18 by threading the pulley assembly 22 onto a portion of the ball nut assembly 18 and then threading a spanner nut on behind it. Alternatively, the ball nut assembly 18 may be secured to the pulley assembly 22 by other suitable means and/or methods.

The ball nut assembly 18 further includes a plurality of force-transmitting members (not shown). The force transmitting members may comprise balls (not shown), which are disposed between an internal screw thread convolution 20A of the ball nut 20 and the external thread convolution 16A on the screw portion 16 of the steering member 14. The balls are loaded into the ball nut assembly 18 in a known manner. The ball nut assembly 18 further includes a recirculation passage (not shown) for recirculating the balls upon axial movement of the steering member 14 relative to the ball nut assembly 18.

In the illustrated embodiment, the electric power steering assembly 10 further includes a bearing assembly, indicated generally at 24. The illustrated bearing assembly may be a single row "4 point" ball type of bearing assembly 24 and includes an outer race 26, an inner race 28 and balls B disposed therebetween. In the illustrated embodiment, the outer race 26 includes a radially outwardly extending flange 30. The flange 30 includes a first radially extending side surface 30A and an opposite second radially extending side surface 30B. Alternatively, the particular construction of the bearing assembly 24 may be other than illustrated if so desired.

The bearing assembly 24 is disposed on a cylindrical outer surface 20A of the ball nut 20. To accomplish this in the illustrated embodiment, a spanner nut 32 is provided. The spanner nut 32 is configured to be screwed onto internal threads 12B provided in an cylindrical inner surface of the housing 12. During assembly, the spanner nut 32 is operative to load the bearing assembly 24 and once assembled the bearing assembly 24 is operative to rotatably support the ball nut 20 relative to the steering member 14. Alternatively, other suitable means and/or methods may be used to retain the bearing assembly 24 and/or to rotatably support the ball nut 20 relative to the steering member 14.

The electric motor is supported relative to the rack housing 12 by suitable means. The electric motor includes an output shaft 34 which is connected to a member 36 (shown in phantom), for rotation therewith. In the illustrated embodiment, the member 36 is a "timing" belt. The timing belt 36 is operatively connected to the pulley assembly 22. Thus, when the electric motor is actuated via a suitable controller (not shown), the timing belt 36 is rotated via the output shaft 34 so as to rotate the pulley assembly 22. The rotation of the pulley assembly 22 causes the ball nut 20 of the ball nut assembly 18 to be rotated. The rotation of the ball nut 20 results in linear movement of the steering member 14. The balls transmit the rotational force of the ball nut 20 to the rack portion of the steering member 14. Because the ball nut 20 is fixed in position axially, the steering member 14 is driven to move axially in response, effecting steering movement of the steerable wheels of the vehicle.

In the illustrated embodiment, the electric power steering assembly 10 further includes a damper or "axial isolator", indicated generally at 38. As will be discussed below, the damper 38 is operatively disposed between selected adjacent surfaces of the bearing assembly 24, the spanner nut 32 and the housing 12.

Figure 2:
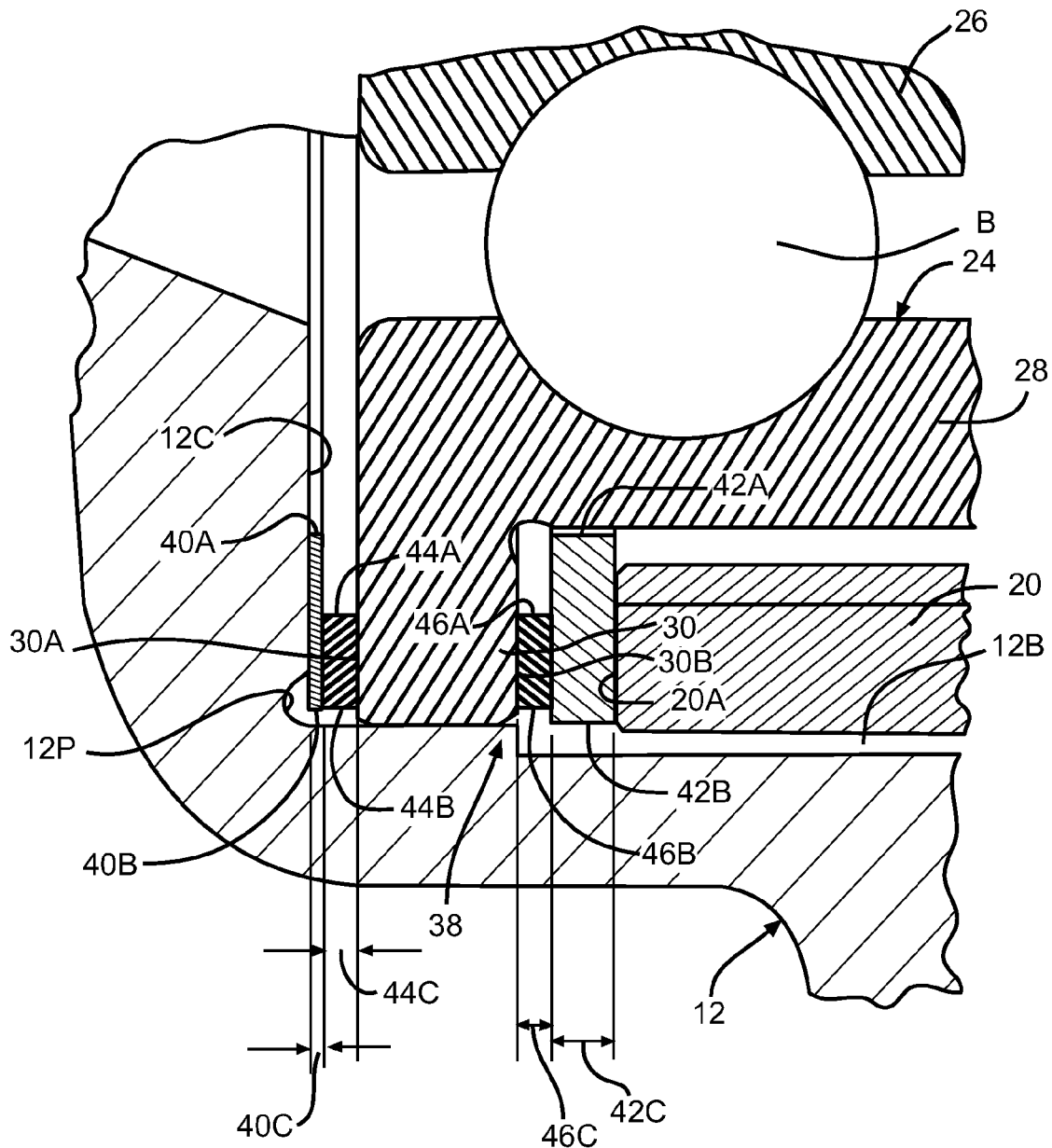
FIG. 2 is an enlarged view of a portion of the vehicle electric power steering assembly illustrated in FIG. 1.
Figure 3:
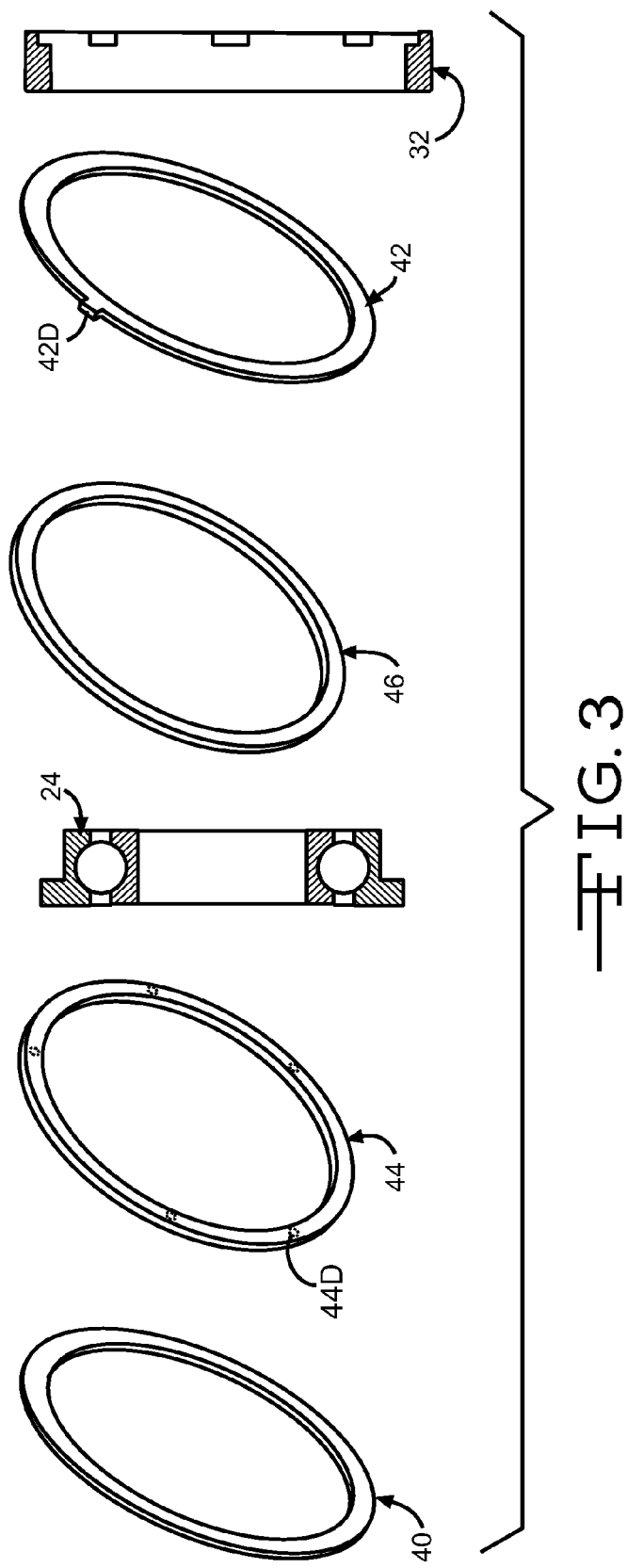
FIG. 3 is an exploded view of selected components of the vehicle electric power steering assembly illustrated in FIGS. 1 and 2.

As best shown in FIGS. 2 and 3, in the illustrated embodiment the damper 38 includes a first member 40, a second member 42, a third member 44 and a fourth member 46. The first member 40 is preferably a generally flat, annular washer or "shim" member which is preferably formed from a suitable rigid or "non-compressible-like" material, such as metal or a rigid non-metal material. In the illustrated embodiment, the first member 40 may be from stamping grade steel or similar materials. In the illustrated embodiment, the first member 40 defines an inner diameter 40A, an outer diameter 40B, and a thickness 40C. In the illustrated embodiment, the thickness 40C may be approximately 0.25 mm.

In the illustrated embodiment, the second member 42 is preferably a generally flat, annular washer or "shim" member which is preferably formed from a suitable rigid or "non-compressible-like" material, such as metal or from a rigid non-metal material. In the illustrated embodiment, the second member 42 may be from stamping grade steel or similar materials. In the illustrated embodiment, the second member 42 defines an inner diameter 42A, an outer diameter 42B, and a thickness 42C. In the illustrated embodiment, the thickness 42C may be approximately 2.0 mm. As shown in the illustrated embodiment, the inner diameters 40A and 42A are the same, the outer diameters 40B and 42B are the same, and the thickness 42C is greater than the thickness 40C.

Figure 4:
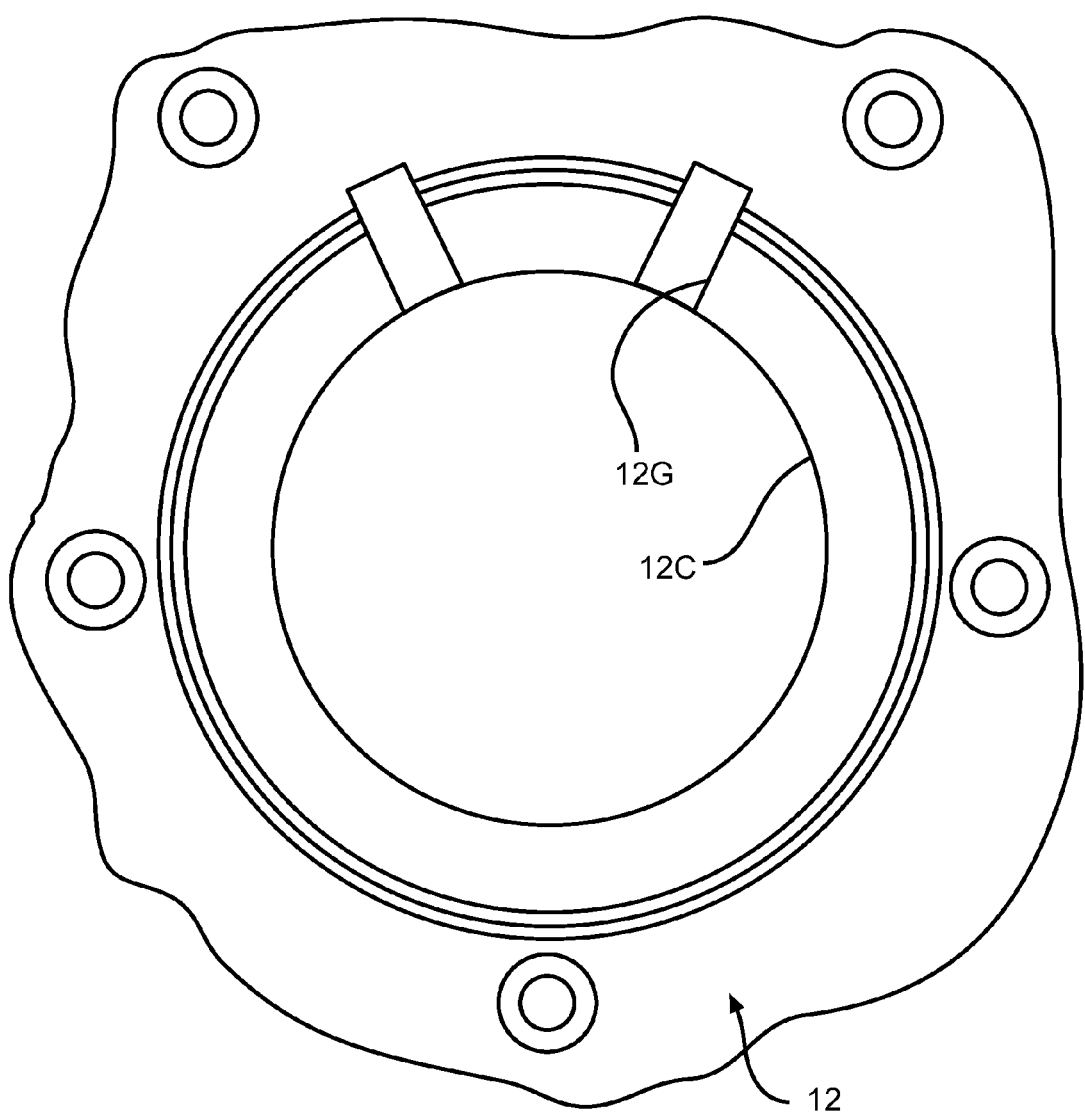
FIG. 4 is a top view of a selected component of the vehicle electric power steering assembly illustrated in FIGS. 1 and 2.

In the illustrated embodiment, the second member 42 is preferably further provided with a tab or projection 42D which projects or extends outwardly from the outer diameter 42B thereof for a purpose to be discussed below. As will be discussed below, in the illustrated embodiment the tab 42D is preferably provided and is disposed in a "vent" groove 12G (shown in FIG. 4), which is provided in an outer cylindrical surface 12C of the housing 12. The vent groove 12G extends in both a radial direction (i.e., outwardly) and an axial direction in the housing 12. Alternatively, the construction, configuration, size, shape and/or material of one or both of the first member 40 and/or second member 42 may be other than illustrated and described.

Also, the first member 40 may not be required and may be considered to be an optional member depending upon the particular construction or type of the associated vehicle electric power steering assembly 10 in which the damper 38 is utilized. However, since the illustrated housing 12 is provided with a vent groove (not shown) and a pocket 12P, the first member 40 is utilized to prevent the third member 44 from "flowing into" or being displaced into the vent groove 12G' and/or the pocket 12P.

In the illustrated embodiment, the third member 44 is preferably a generally flat, annular washer or "shim" member which is preferably formed from a suitable damping or isolating or "compressible-like" material, such as an elastomeric material. In the illustrated embodiment, the third member 44 may be from a rubber material, such as for example, a nitrile rubber (NBR), neoprene (chloroprene CR) and urethane or from silicone. In the illustrated embodiment, the third member 44 defines an inner diameter 44A, an outer diameter 44B, and a thickness 44C. In the illustrated embodiment, the thickness 44C may be approximately 1.035 mm.

In the illustrated embodiment, the fourth member 46 is preferably a generally flat, annular washer or "shim" member which is preferably formed from a suitable damping or isolating or "compressible-like" material, such as an elastomeric material. In the illustrated embodiment, the fourth member 46 may be from a rubber material, such as for example, a nitrile rubber (NBR), neoprene (chloroprene CR) and urethane or from silicone. In the illustrated embodiment, the fourth member 46 defines an inner diameter 46A, an outer diameter 46B, and a thickness 46C. In the illustrated embodiment, the thickness 46C may be approximately 1.035 mm.

As shown in the illustrated embodiment, the inner diameters 44A and 46A are the same, the outer diameters 44B and 46B are the same, and the thicknesses 44C and 46C are the same. Thus, it can be realized that in the illustrated embodiment the construction of the third member 44 and the fourth member 46 are the same. Also, as shown in the illustrated embodiment, the outer diameters 40B and 42B are slightly greater than the outer diameters 44B and 46C and the inner diameters 44A and 46A are greater than the inner diameters 40A and 42A.

Alternatively, the construction, configuration, size, shape and/or material of one or both of the third member 44 and/or fourth member 46 may be other than illustrated and described. For example, the construction of the third member 44 may be different from that of the fourth member 46 in one or more ways. In addition, one or both of the third member 44 and/or fourth member 46 may be provided with bumps (such as shown in phantom in FIG. 3 at 44D in connection with the third member 44), projections, indentations, recesses, and/or grooves, for example, provided on one or both sides thereof. Also, the third member 44 (if provided) may be bonded, molded or otherwise secured to the first member 40 and/or the flange 30 of the outer race 28 of the bearing 24, and/or the fourth member 46 may be bonded, molded or otherwise secured to the second member 42 and or the flange 30 of the outer race 28 of the bearing 24.

As can be seen best in FIG. 2, when the illustrated components are assembled and then secured in place via the spanner nut 20, the first member 40 is disposed between a radially extending inner surface 12C of the housing 12 and the third member 44, and the third member 44 is disposed and preferably at least slightly compressed between the first member 40 and the radially extending side surface 30A of the flange 30 of the outer race 28. Also, the second member 42 is disposed between a radially extending end surface 20A of the spanner nut 20 and the fourth member 46, and the fourth member 46 is disposed and preferably at least slightly compressed between the second member 42 and the radially extending side surface 30B of the flange 30 of the outer race 28.

Also, as discussed above, the second member 42 is preferably provided with the tab 42C which is disposed in the vent groove 12G of the housing 12. The purpose for this is so that when the spanner nut 20 is installed via rotating it in the housing 12 to the left in FIG. 2 toward the housing wall 12C, the tab 42C is operative to "lock in place" and allow for axial movement but prevent any rotational motion of the second member 42 due to its contact with the spanner nut 20 as the spanner nut 20 is rotated and moves axially 12 as it is installed in the housing 12. As a result of this, the rotational motion of the spanner nut 20 will not be imparted via the second member 44 to the third member 44 and the fourth member 46 during installation, with such rotation possibly "grabbing" the members 44 and 46 and causing the members 44 and 46 to "bunch" or otherwise undesirably distort or deform during installation.

However, it is to be understood that other means and/or methods may be utilized to facilitate and/or prevent such bunching or distortion or deformation or otherwise being damaged during assembly and installation. For example, depending upon the particular material of the members 44 and 46, any such bunching or distortion during installation may be prevented or minimized to an extent that the tab 42C may not be needed on the second member 42. In addition, a lubricant and/or one or more features or elements may be provided on one or more of the members 40, 42, 44 and/or 46 which are operative to aid in reducing or preventing damage to the members 44 and 46 during installation and which may even allow the tab 42C not to be needed on the second member 42.

A potential advantage of the electric power steering assembly 10 is that the third member 44 and fourth member 46 should be effective to "decouple" the ball nut 20 and rack portion of the steering member 14 from the housing 12 to thereby reduce system noise, vibration and harshness (NVH), from being transmitted into the housing and thus into the vehicle.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. A rack drive assembly adapted for use in a vehicle electric power steering assembly comprising:
   a steering member disposed in a rack housing and including a rack portion operatively connected to a vehicle steering wheel and a screw portion;
   a ball nut assembly operatively connected to said screw portion of said rack portion of said steering member for effecting axial movement of said steering member upon rotation of a vehicle steering wheel;
   a bearing assembly disposed in said rack housing and carried by said ball nut assembly for rotatably supporting said ball nut assembly relative to said steering member; and
   a spanner nut configured to engage a threaded portion of said rack housing for securing said bearing assembly in said rack housing;
   wherein a first isolator, a second isolator and a first shim are provided, said first isolator disposed between an inner surface of said housing and a first surface of an outer race of said bearing, said second isolator disposed between an opposite second surface of said outer race of said bearing and said first shim, said first shim disposed between said second isolator and said spanner nut, wherein said first shim is provided with a member configured to be coupled to said housing to prevent rotation of said shim during installation of said spanner nut, wherein said member is a radially outwardly extending tab provided on an outer portion of said first shim and is configured to be disposed in a radially outwardly and axially extending groove provided in said housing, wherein said groove is provided along said threaded portion of said rack housing.

2. The rack drive assembly according to claim 1 wherein said outer race of said bearing assembly is provided with a radially outwardly extending flange, said flange including a first radially extending side surface and an opposite second radially extending side surface, wherein said first isolator is disposed adjacent said first radially extending side surface and said second isolator is disposed adjacent said second radially extending side surface.

3. The rack drive assembly according to claim 1 wherein said first and second isolators are formed from a compressible material.

4. The rack drive assembly according to claim 1 wherein said first shim is formed from a non-compressible material.

5. The rack drive assembly according to claim 1 wherein said first and second isolators are formed from a compressible material and said first shim is formed from a non-compressible material.

6. The rack drive assembly according to claim 1 wherein said first and second isolator members are identical members.

7. The rack drive assembly according to claim 1 further including a second shim, wherein said second shim is disposed between said inner surface of said housing and said first isolator.

8. The rack drive assembly according to claim 7 wherein said first and second isolators are formed from a compressible material and said first and second shims are formed from a non-compressible material.

9. The ball nut assembly according to claim 1 further including a second shim, wherein said second shim is disposed between said inner surface of said housing and said first isolator.

10. A rack drive assembly adapted for use in a vehicle electric power steering assembly comprising:
   a steering member disposed in a rack housing and including a rack portion operatively connected to a vehicle steering wheel and a screw portion;
   a ball nut assembly operatively connected to said screw portion of said rack portion of said steering member for effecting axial movement of said steering member upon rotation of a vehicle steering wheel;
   a bearing assembly disposed in said rack housing and carried by said ball nut assembly for rotatably supporting said ball nut assembly relative to said steering member, said bearing assembly having an outer race provided with a radially outwardly extending flange, said flange including a first radially extending side surface and an opposite second radially extending side surface; and
   a spanner nut configured to engage a threaded portion of said rack housing for securing said bearing assembly in said rack housing;
   wherein a first isolator, a second isolator and a first shim are provided, said first isolator disposed between an inner surface of said housing and said first radially extending side surface of said flange of said outer race of said bearing, said second isolator disposed between said second radially extending side surface of said flange of said outer race of said bearing and said first shim, said first shim disposed between said second isolator and said spanner nut, wherein said first shim is provided with a member configured to be coupled to said housing to prevent rotation of said shim during installation of said spanner nut, wherein said first shim is formed from a non-compressible material, wherein said member is a radially outwardly extending tab provided on an outer portion of said first shim and is configured to be disposed in a radially outwardly and axially extending groove provided in said housing, wherein said groove is provided along said threaded portion of said rack housing.

11. The rack drive assembly according to claim 10 wherein said first and second isolators are formed from a compressible material.

12. The rack drive assembly according to claim 10 wherein said first and second isolator members are identical members.

13. The rack drive assembly according to claim 10 further including a second shim, wherein said second shim is disposed between said inner surface of said housing and said first isolator.

14. The rack drive assembly according to claim 13 wherein said first and second isolators are formed from a compressible material and said second shim is formed from a non-compressible material.

15. A ball nut assembly adapted for use in a rack drive assembly of a vehicle electric power steering assembly, the rack drive assembly including a steering member disposed in a rack housing and having a rack portion operatively connected to a vehicle steering wheel and a screw portion, said ball nut assembly comprising:
   a ball nut assembly operatively connected to said screw portion of said rack portion of said steering member for effecting axial movement of said steering member upon rotation of a vehicle steering wheel;
   a bearing assembly fixedly disposed in said rack housing and carried by said ball nut assembly for rotatably supporting said ball nut assembly relative to said steering member; and
   a spanner nut configured to engage a threaded portion of said rack housing for securing said bearing assembly in said rack housing;
   wherein a first isolator, a second isolator and a first shim are provided, said first isolator disposed between an inner surface of said housing and a first surface of an outer race of said bearing, said second isolator disposed between an opposite second surface of said outer race of said bearing and said first shim, said first shim disposed between said second isolator and said spanner nut, wherein said first shim is provided with a member configured to be coupled to said housing to prevent rotation of said shim during installation of said spanner nut, wherein said member is a radially outwardly extending tab provided on an outer portion of said first shim and is configured to be disposed in a radially outwardly and axially extending groove provided in said housing, wherein said groove is provided along said threaded portion of said rack housing.

16. The ball nut assembly according to claim 15 wherein said outer race of said bearing assembly is provided with a radially outwardly extending flange, said flange including a first radially extending side surface and an opposite second radially extending side surface, wherein said first isolator is disposed adjacent said first radially extending side surface and said second isolator is disposed adjacent said second radially extending side surface.

17. The ball nut assembly according to claim 15 wherein said first and second isolators are formed from a compressible material and said first shim is formed from a non-compressible material.

* * * * *